C. R. WOLCOTT.
ROTARY MOTOR.
APPLICATION FILED DEC. 6, 1907.
925,149.
Patented June 15, 1909.
2 SHEETS—SHEET 1.
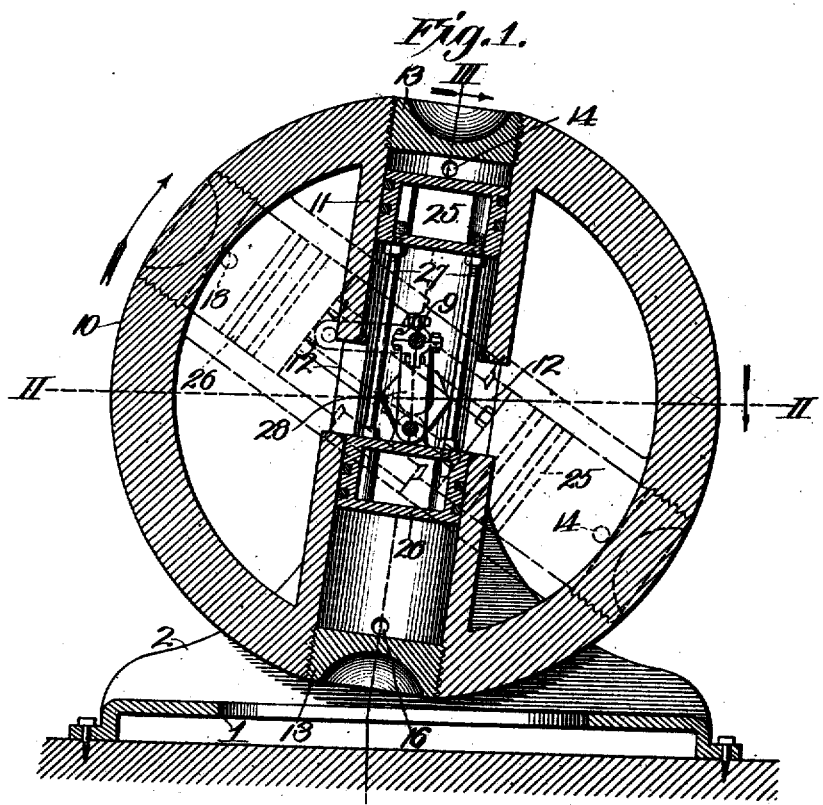
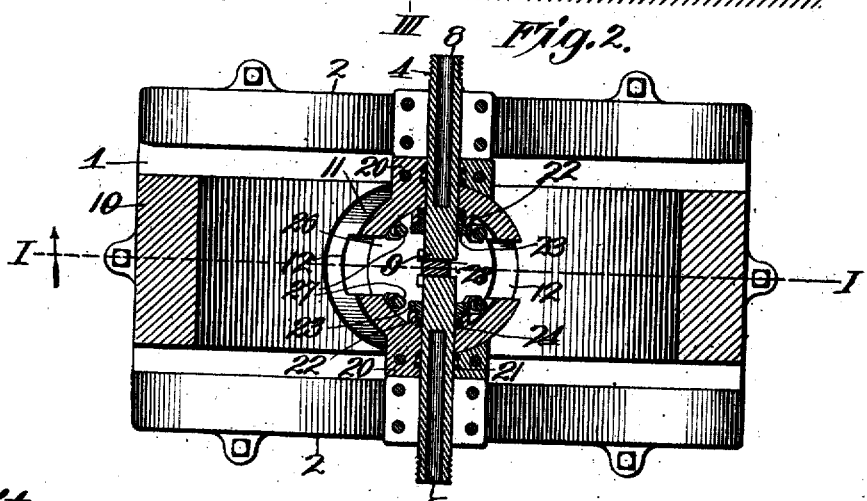
Witnesses:
Frank B. Glore
H. C. Rodgers
Inventor:
C. R. Wolcott
By George H. Loope Atty.

C. R. WOLCOTT.
ROTARY MOTOR.
APPLICATION FILED DEC. 6, 1907.
925,149.
Patented June 15, 1909.
2 SHEETS—SHEET 2.
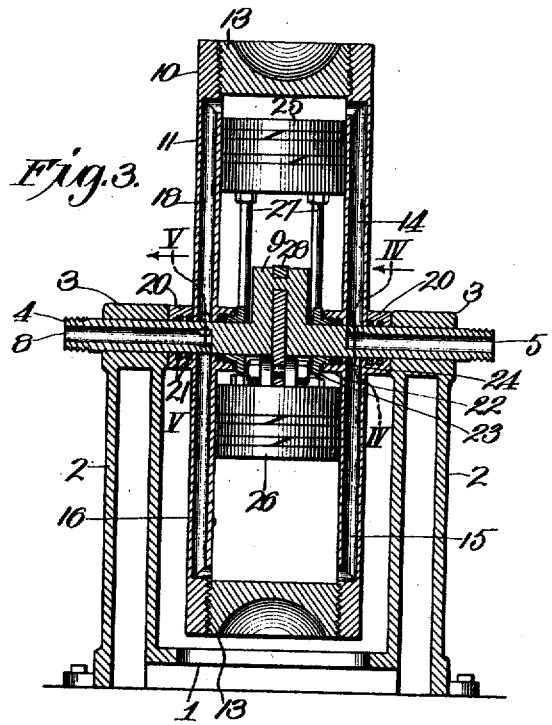
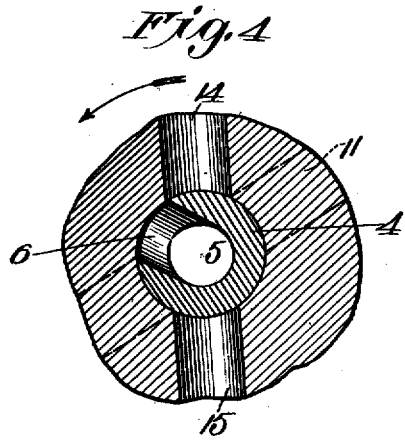
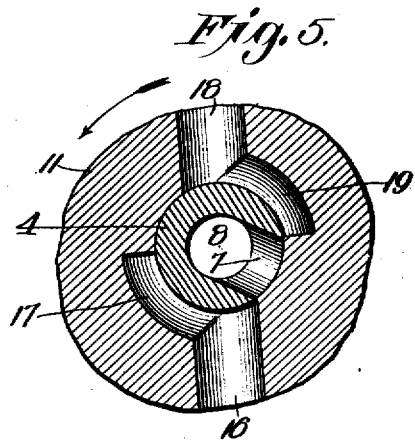
Witnesses:
Frank R. Glare
H. C. Rodgers
Inventor:
C. R. Wolcott,
By George H. Hope Atty

UNITED STATES PATENT OFFICE.

CORNELIUS R. WOLCOTT, OF McLOUTH, KANSAS.

ROTARY MOTOR.

No. 925,149.  Specification of Letters Patent.  Patented June 15, 1909.

Application filed December 6, 1907. Serial No. 405,427.

*To all whom it may concern:*

Be it known that I, CORNELIUS R. WOLCOTT, a citizen of the United States, residing at McLouth, in the county of Jefferson and State of Kansas, have invented certain new and useful Improvements in Rotary Motors, of which the following is a specification.

This invention relates to rotary motors, and my object is to produce a motor of this character which will operate efficiently and reliably and which is of simple, strong, durable, compact and inexpensive construction.

With this general object in view and others as hereinafter appear, the invention consists in certain novel and peculiar features of construction and organization as hereinafter described and claimed; and in order that it may be fully understood reference is to be had to the accompanying drawings in which—

Figure 1, is a central vertical section taken on the line I—I of Fig. 2. Fig. 2, is a section on the line II—II of Fig. 1. Fig. 3, is a section on the line III—III of Fig. 1. Fig. 4, is an enlarged section on the line IV—IV of Fig. 3. Fig. 5, is an enlarged section on the line V—V of Fig. 3.

In the said drawings, 1 indicates the bottom and 2 bearing standards of a suitable stationary framework, the upper ends of the standards in conjunction with bearing caps 3 forming supports for rigidly holding the horizontal shaft 4, provided at one end with a longitudinal bore 5 terminating in an opening 6, said bore and opening forming the inlet port of the motor, as hereinafter appears. The shaft is also provided with an opening 7 communicating with the longitudinal bore 8, said opening and bore forming the exhaust port, and midway between the openings 6 and 7 the shaft is provided with a crank 9 which preferably projects vertically upward.

10 indicates a wheel which forms at once the fly and belt or power-transmission wheel and is arranged centrally between the bearing standards and is provided with a diametrically arranged cylinder 11, which cylinder may be cast integral with the wheel as shown or secured rigidly thereto in any suitable manner. Midway its length and at right angles to the shaft the cylinder is provided with a pair of openings 12, and the ends of the cylinder are preferably closed by screw plugs or heads 13.

14 and 15 indicate alined radial passages in the wall of the cylinder and communicating with the same at its outer ends, said passages being adapted once in each revolution to alternately communicate with the inlet port opening 6 to conduct steam to the interior of the cylinder.

16 indicates a passage in the wall of the cylinder and communicating with the interior of the latter at its outer end and at its inner end with an extension 17 substantially paralleling the shaft and extending rearwardly with respect to the direction of rotation of the wheel.

18 indicates a passage in the wall of the cylinder arranged diametrically opposite and alined with passage 16, and communicating with the cylinder at its opposite end, the inner end of passage 18 being provided with an extension 19 which like extension 17 extends rearwardly with respect to the direction of rotation of the wheel, the passage 16 with its extension 17 and the passage 18 with its extension 19 being adapted to alternately register with discharge port opening 7 for the purpose of conducting the exhaust steam from the cylinder.

20 indicates hub portions projecting from opposite sides of the cylinder and engaging the inner sides of the bearings and 21 are spring rings within said hubs and forming steam tight joints between the same and the shaft.

22 are inwardly projecting hubs of the cylinder and forming in conjunction with packing glands 23 and packing 24 stuffing boxes to establish a steam tight joint with the shaft.

25 and 26 are pistons fitting within the cylinder at opposite sides of the shaft and connected together by tie rods 27, and 28 is a link pivotally connecting the crank of the shaft with one of said pistons.

In practice assuming that the parts are in the position shown and that steam is employed for operating the motor, said steam passes through bore 5 and into passage 14 (see Fig. 4) and is discharged by the latter into the cylinder outward of piston 25, it being noted by reference to Fig. 5 that the exhaust passage 16 of the cylinder is in engagement at the same moment with the exhaust port of the shaft. As the steam thus enters one end and exhausts from the other of the cylinder, it forces piston 25 inwardly and the latter forces piston 26 outwardly, the last of these actions being to cause link 28 to swing in the direction indicated by the contiguous arrow Fig. 1, with crank 9 as the axis of movement, the wheel and cylinder at the same time rotating in the same direction with the shaft 4 as the axis of movement. As a result of the rotation of the crank around an axis disposed out of alinement with that of the cylinder and wheel the latter are caused to rotate as explained. By the time the wheel has rotated sufficiently to cause the passage 14 to move from the position shown in full to the position shown in dotted lines Fig. 4, which is something in excess of ninety degrees, the piston 25 has moved inwardly and piston 26 outwardly something in excess of one-fourth of their full stroke. During this movement passage 16 is in communication with the exhaust port of the shaft and by reason of its extension 17 continues in engagement with said exhaust port until the wheel has made a full half revolution, at which time the pistons 25 and 26 have reached the inner and outer ends of their strokes, respectively, it being understood that the pistons are operated under expansion of the steam outward of piston 25 until passage 14 has attained the position shown by passage 15 in full lines Fig. 4, it being likewise understood that the last-named passage has at such time attained the position shown by passage 14 in full lines, same figure, it being also understood that as passage 15 comes into communication with the inlet port and passage 18 with the exhaust port, steam passes from the first-named passage into the cylinder outward of piston 26 and escapes from the cylinder through passage 18 to the exhaust port of the shaft. The result of this action reverses the movement of the pistons and causes the wheel with the momentum already acquire to start on its second half revolution. After passage 15 passes out of engagement with the inlet port, the steam already discharged into the cylinder through said passage 15 continues the operation described, by expansion. When the reverse movement of the pistons is ended the wheel has made one complete revolution and thus the steam is again automatically discharged from the inlet port into the cylinder outward of piston 25 and the actions already described are repeated again and again as long as the motor is in operation.

If desired the motor may be used as an explosive motor or gas engine, any suitable equipment, not shown being employed to produce alternate explosions outward of the pistons. It will be noticed by reference to the dotted lines in Fig. 1 which indicate the position of the cylinder and the pistons after the same have turned a distance corresponding to that indicated by the dotted lines Fig. 4, that the openings 12 are provided in the cylinder to accommodate the crank 9 though it will be understood that by making the cylinder larger in proportion the necessity of providing said openings would be avoided.

From the above description it will be apparent that I have produced a rotary motor possessing the features of advantage enumerated as desirable and I wish it to be understood that I do not desire to be limited to the exact details of construction shown and described, for obvious modifications will occur to a person skilled in the art.

Having thus described the invention what I claim as new and desire to secure by Letters-Patent, is:—

The improved rotary motor herein described and shown comprising supporting standards, a horizontal shaft secured rigidly on said standards and provided in its ends with longitudinal bores having lateral ports at their inner ends, the shaft being further provided with a crank between said longitudinal bores, a wheel disposed between the standards and arranged concentrically around the shaft, a cylinder disposed diametrically within the wheel, the cylinder being provided in its opposite walls with pairs of alined radial passages adapted to register at their inner ends with the ports at the ends of the bores in the shaft and communicating at their outer ends with the interior of the cylinder, the said passages forming the exhaust pair being extended in opposite directions partly around the shaft, pistons fitted in the cylinder at opposite sides of the shaft, tie rods connecting said pistons, and a link connecting one of the pistons with the crank of the shaft.

In testimony whereof I affix my signature, in the presence of two witnesses.

CORNELIUS R. WOLCOTT.

Witnesses:
E. D. GLYNN,
A. CRESSE.